Dec. 27, 1960 J. E. HAWKINS 2,966,627
METHOD AND APPARATUS FOR ELECTRICAL PROSPECTING
Filed Nov. 14, 1956 4 Sheets-Sheet 1
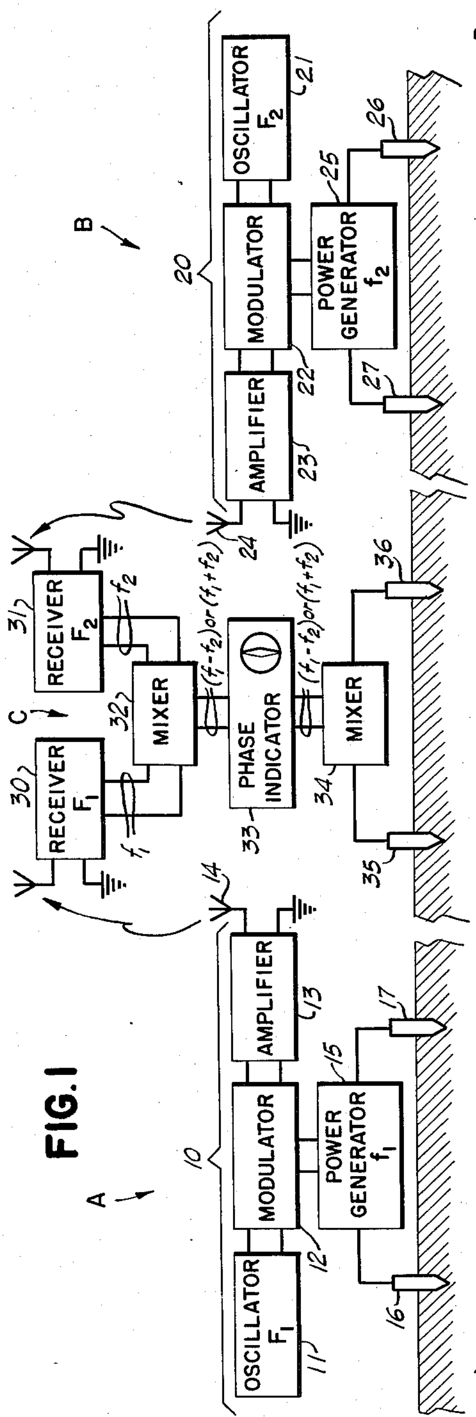
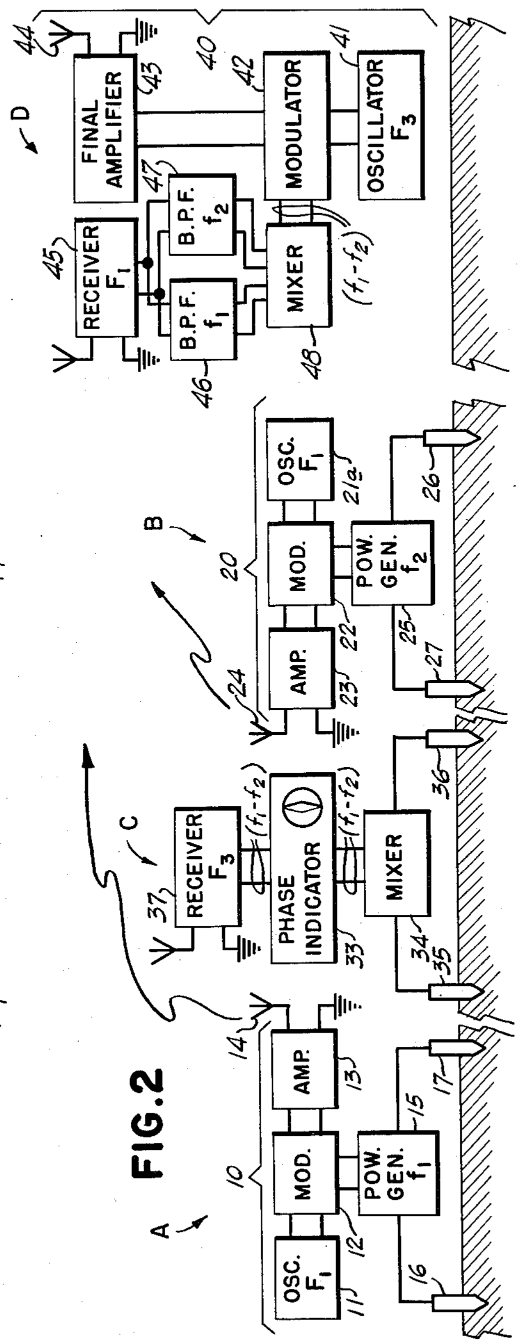
INVENTOR
JAMES E. HAWKINS
BY
Mason, Kolehmainen, Rathburn and Wyss
ATTORNEYS METHOD AND APPARATUS FOR ELECTRICAL PROSPECTING
Filed Nov. 14, 1956
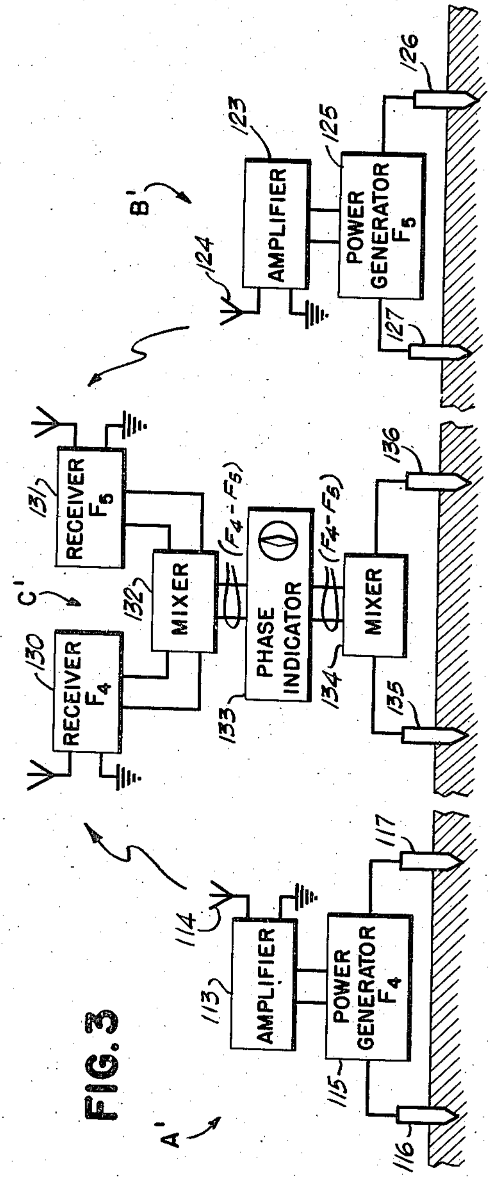
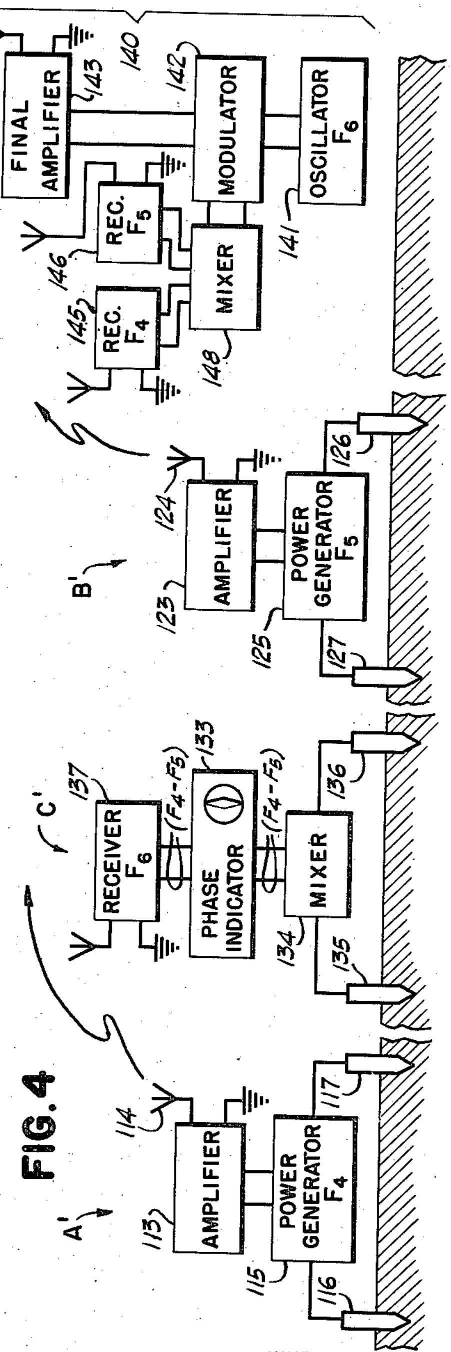
INVENTOR
JAMES E. HAWKINS
BY
Mason, Kolehmainen, Rathburn and Wyss.
ATTORNEYS Dec. 27, 1960 J. E. HAWKINS 2,966,627

METHOD AND APPARATUS FOR ELECTRICAL PROSPECTING

Filed Nov. 14, 1956 4 Sheets-Sheet 3

INVENTOR
JAMES E. HAWKINS

BY
*Mason, Kolehmainen, Rathburn and Wyss*
ATTORNEYS.

Dec. 27, 1960 J. E. HAWKINS 2,966,627

METHOD AND APPARATUS FOR ELECTRICAL PROSPECTING

Filed Nov. 14, 1956 4 Sheets-Sheet 4

INVENTOR

JAMES E. HAWKINS

BY

Mason, Kolehmainen, Rathburn and Wyss.

ATTORNEYS

United States Patent Office 2,966,627

Patented Dec. 27, 1960

2,966,627

METHOD AND APPARATUS FOR ELECTRICAL PROSPECTING

James E. Hawkins, Broken Arrow, Okla., assignor to Seismograph Service Corporation, Tulsa, Okla., a corporation of Delaware Filed Nov. 14, 1956, Ser. No. 622,097

24 Claims. (Cl. 324—1)

The present invention relates to a method and apparatus for electrical prospecting and is particularly concerned with a system of this type wherein signals are developed at spaced apart transmitting points for propagation to a reception point where the phase relationship between received signals may be determined in order to ascertain the effect of the earth upon the propagated signals.

Electrical prospecting systems employing radio frequency waves heretofore proposed have generally fallen into two groups: (1) systems in which the variations in antenna emission resulting from subsurface conditions are measured; (2) systems in which signal strength of radiated signals is determined and those variations which are attributable to anomalous earth conditions are evaluated. The usefulness of all of these systems has been severely limited, however, due to the fact that there are innumerable interferences from topography and near surface variations in moisture, mineralization, and the like and, accordingly, it has been exceedingly difficult to determine those variations in the measurements that can properly be attributed to the nonhomogeneous earth formations which the survey is attempting to locate and identify. In addition, it is well known that systems which employ field strength measurements usually possess poor sensitivity in that relatively large variations are necessary to produce measurable changes in the indications with the result that the information provided by such systems is often inaccurate or, at least, is difficult to interpret. Moreover, systems of this type have generally been characterized by shallow depth penetration, particularly in those soil formations normally encountered in temperate climates and, as a result, information concerning relatively deep formations or nonhomogeneities has not been obtained.

Among the attempts to device a system avoiding the aforementioned difficulties have been systems in which the surface formations are excited by relatively large current supplied from spaced apart current electrodes or from a current loop, and the detection of this current at a location where the voltages received may be compared either with respect to amplitude or phase. The interpretation of the measurements made at the detecting location depends upon the fact that the current distribution and, hence, the detected voltages, can be calculated for homogeneous earth and, further, that the presence of conducting bodies in homogeneous earth will give rise to secondary voltages or phase variations. Anomalous voltage or phase measurements are thus indicative of the presence of such conducting bodies and the magnitude of these variations can be ascertained by subtracting the standard or calculated value from the observed readings.

As a rule of thumb, one-half of the current travels in homogeneous earth formations above a depth equal to the distance between the supply electrodes or excitation points and, accordingly, in order to obtain adequate depth of penetration it may be necessary to space the current electrodes a considerable distance apart or to provide a loop of similar magnitude. Since it is rather difficult to maintain the voltages applied at the excitation points constant for a period sufficient to permit the high precision measurements required in geologic surveys, the detected signals are usually compared with a reference voltage supplied via a cable or transmission line extending through the area being surveyed between the detecting location and the widely spaced supply electrodes. The use of such a cable not only increases the cost of installation of the system, but it introduces problems with respect to handling of the cable during the survey and with respect to storage after the survey is completed. In addition, and perhaps even more important, the current flowing through the conductor creates a field which tends to cancel the primary field established in the earth formations due to the fact that the direction of current flow in the cable is opposite to the current flow through the earth. Thus, measurements made in the vicinity of the cable are inaccurate and difficult to interpret since they are generally less sensitive to subsurface variations.

It is therefore a primary object of the present invention to provide a new and improved electrical prospecting method and apparatus in which all of the above-mentioned disadvantages of the prior art are obviated.

Another object of the present invention is to provide an improved electrical prospecting system employing at least two spaced apart excitation points for supplying current to the earth formations for propagation to a detecting location in which the use of cables interconnecting the excitation points and the detecting location is avoided.

A further object of the present invention is to provide a new and improved electrical prospecting system employing radio frequency waves in which the system components may be so arranged as to control the effective depth of penetration of the subsurface formations.

It is also an object of the present invention to provide a novel electrical prospecting method and apparatus characterized by highly accurate measurements which may be readily interpreted to determine the presence of nonhomogeneities in the earth formations.

The invention, both as to its organization and method of operation, together with further objects and advantages thereof, will best be understood by reference to the specification taken in conjunction with the accompanying drawings in which:

Fig. 1 diagrammatically illustrates an electrical prospecting system characterized by the features of the present invention;

Fig. 2 diagrammatically illustrates an alternative arrangement of the electrical prospecting system of the present invention in which the accuracy of the measurements is improved;

Fig. 3 diagrammatically illustrates still another arrangement of the electrical prospecting system of the present invention in which the depth of penetration is different from that of the system shown in Fig. 1;

Fig. 4 is a diagrammatic illustration of a further arrangement of the present invention incorporating the principles of the systems shown in Figs. 2 and 3;

Figure 6:
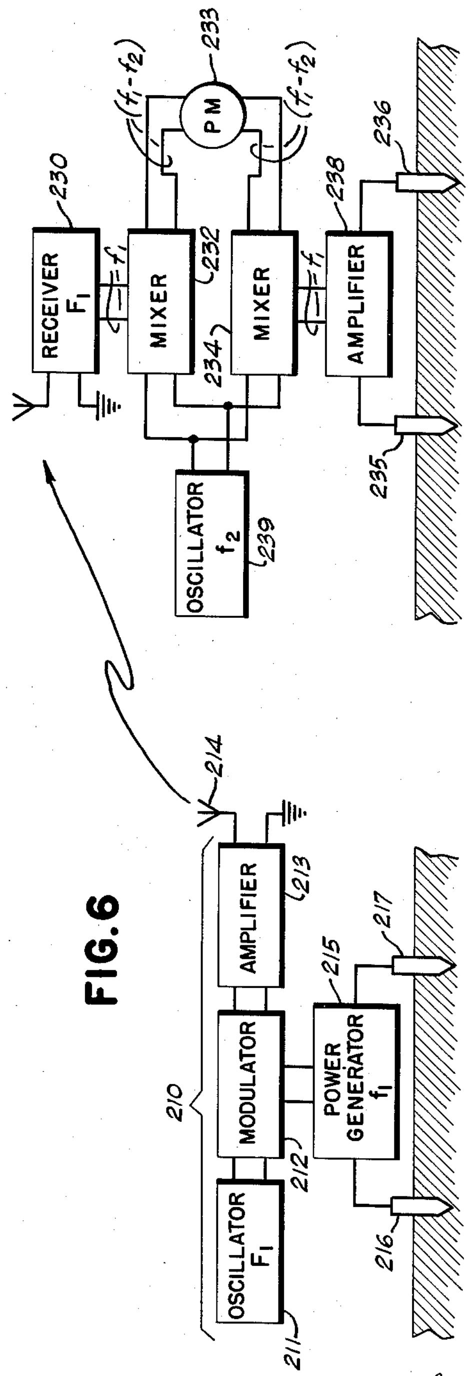
Figure 7:
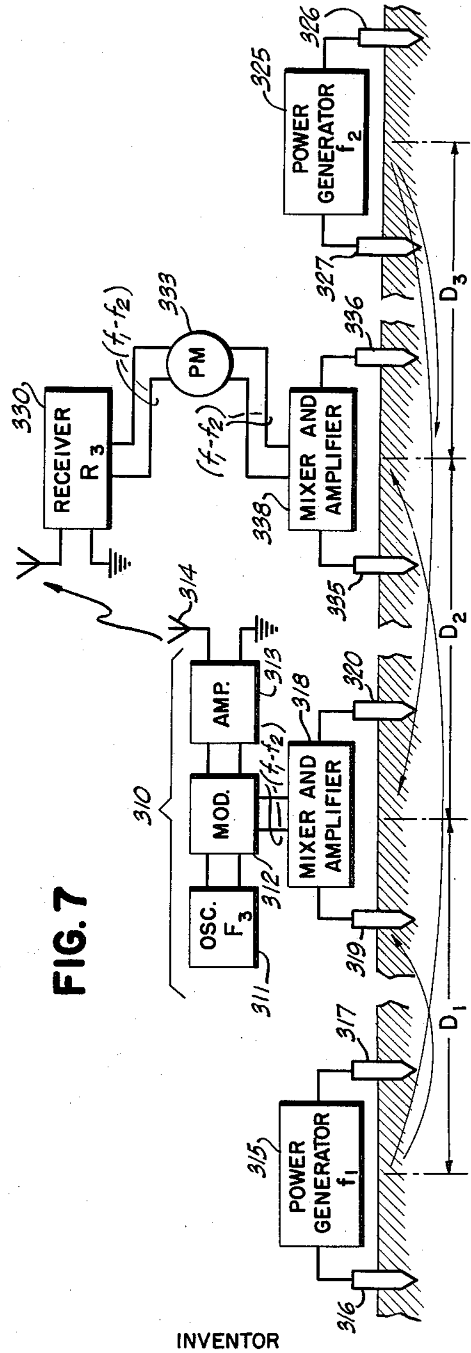

Fig. 6 diagrammatically illustrates another system characterized by the features of the present invention; and Fig. 7 is a diagrammatic illustration of a still further embodiment of the present invention.

In accordance with the practice of the present invention, alternating currents of different frequency are supplied to the earth from at least two spaced apart points for reception and detection at a movable receiving station. The receiving station is moved to positions of known location relative to the current supply points and the phase relationship between the detected currents and a reference signal is determined. To effect the latter determination, a reference signal is obtained at the receiving station representative of the beat frequency between the applied currents and the phase of this reference signal is compared with that of a beat frequency obtained by directly heterodyning the detected currents. Since each of the positions of the receiving station relative to the current supply points is known, the measured phase relationship may be compared with a computed value obtained by assuming homogeneous earth formations. Any deviation between the measured and computed phase relationship will, of course, be indicative of the presence of a conducting or non-homogeneous body. The frequencies of the applied currents may be varied to obtain different depth penetrations in order to facilitate at least a qualitative determination of the depth of the anomalous condition encountered, as well as an indication of the size of the anomaly producing the phase variation.

Referring now to the drawings and more particularly to Fig. 1 thereof, the present invention is there illustrated as embodied in a two-foci electrical prospecting system including a pair of spaced apart transmitting points or current sources A and B for producing signals which may be employed to provide phase indications at a detecting or receiving location C located in the general area between the transmitting points and at predetermined distances from each of these points. More specifically, the detecting or receiving location C comprises mobile receiving equipment which may be moved to a series of predetermined locations relative to the transmitting points A and B in order to provide a set of phase indications which may be utilized to indicate anomalous earth conditions existing in the area in which the transmitting points are effective. The distance between each of these receiving locations and the points A and B is accurately determined by means other than radio surveying such as by chaining with a steel tape or the like. The phase indications provided at each of the receiving locations may then be computed for homogeneous earth formations and the computed values may be compared with the observed readings so that anomalous phase indications are indicative of changes in the ground parameters or, in other words, changes in geologic conditions. In order to obtain as great a phase shift as possible between the signals emanating from the stations A and B and hence to maximize the sensitivity of the phase readings, the various receiving locations are preferably located on a line between the two transmitting points or in the general area between these two points so that the transmission paths from each of the transmitting points to each receiving location will be over entirely different routes, thereby accentuating the phase shifts due to the changes in the ground conditions.

To effect the foregoing results, the transmitting point A includes a transmitter 10 for providing a space radiated wave which may be transmitted through the air to the receiving location C. The transmitter 10 includes an oscillator or carrier wave generator 11 for developing radio frequency signals having a frequency $F_1$, a modulator 12 for modulating the signals developed by the oscillator 11 and a final amplifier 13 through which the signals produced by the modulator 12 are passed to a radiating or emitting antenna 14.

In addition to the transmitter 10, the transmitting point A includes a power generator 15 for developing relatively high power, low frequency signals of frequency $f_1$ which are supplied both to the modulator 12 and to the earth. The output of the power generator may be supplied to the earth through grounded current electrodes 16 and 17 or through a current supply loop so that relatively low frequencies are supplied to the earth formations for transmission through the ground to each of the receiving locations C. The modulator 12, of course, functions to modulate the carrier wave developed by the oscillator 11 with the low frequency signals developed by the power generator 15 with the result that a modulated carrier wave is continuously radiated from the transmitting point A.

In similar manner, the equipment provided at the transmitting point B includes a transmitter 20 for continuously radiating a modulated carrier wave to each of the receiving locations C. To this end, the transmitter 20 comprises an oscillator or carrier wave generator 21 for developing radio frequency signals having a frequency $F_2$, a modulator 22 for amplitude modulating the carrier wave developed by the oscillator 21 and a final amplifier 23 through which the output signals from the modulator 22 are passed to a radiating or emitting antenna 24. The transmitting point B, in addition to the transmitter 20 just described, includes a power generator 25 for developing relatively high power, low frequency signals having a frequency $f_2$, which signals are simultaneously applied to the modulator 22 and to the earth. Again, the low frequency signals developed by the power generator 25 may be supplied to the earth by means of spaced apart current electrodes 26 and 27 or by a current supply loop. The low frequency signals passed to the modulator 22 from the power generator 25 are, of course, amplitude modulated upon the carrier wave developed by the oscillator 21 with the result that the transmitting point B is effective continuously to radiate a modulated carrier wave to each of the receiving locations C.

The equipment provided at the receiving location C includes a pair of receivers 30 and 31 which are respectively tuned to receive the modulated carrier waves radiated from the transmitting points A and B. The receiver 30 is sufficiently selective to reject the carrier wave radiated from the transmitting point B while the selectivity of the receiver 31 is such that the carrier wave radiated from the transmitting point A is rejected. The modulated carrier wave accepted by the receiver 30 is detected and the $f_1$ modulation component is reproduced and passed to a mixer circuit 32. In similar manner, the modulated carrier wave accepted by the receiver 31 is detected and the $f_2$ modulation component is passed to the mixer 32 where it is heterodyned with the low frequency signals of frequency $f_1$ supplied from the receiver 30 to produce a reference signal. To this end, the output of the mixer 32 may be tuned to develop either the sum or the difference frequency of the two input signals.

The low frequency signals supplied to the ground at the points A and B travel through the earth formations to the receiving location where they are picked up or received by suitable detecting means which may take the form of a pickup loop or, as illustrated in Fig. 1, may comprise a pair of spaced apart current electrodes 35 and 36. The latter electrodes are respectively connected to the input circuits of a mixer 34 which heterodynes or mixes the input signals of frequencies $f_1$ and $f_2$ and produces either the sum or difference frequency in its output circuit. The output circuit of the mixer 34 is designed to pass the selected beat frequency to a phase indicator 33. The phase indicator 33 is preferably of the type described and claimed in the United States Patent No. 2,551,211 of James E. Hawkins and B. W. Koeppel, assigned to the same assignee as the present invention, and as a result this indicator measures the phase relationship between the two low frequency signals applied to its opposed sets of signal input terminals from the mixers 32 and 34.

As previously indicated, the distance between each of the receiving locations C and the transmitting points A and B is measured in any suitable manner as by chaining with a steel tape so that the phase of the signals transmitted through the ground may be computed for homogeneous earth formations. The phase of the reference signal is affected only slightly by the existence of anomalous conditions since the waves employed to develop this reference signal travel through the air, and, hence, any deviation of the indications appearing on the phase indicator 33 from the computed values for homogeneous earth formations is indicative of the existence of anomalous earth conditions.

To obtain relatively large depth penetration in large scale prospecting, the current electrodes 16 and 17 at the transmitting point A and the electrodes 26 and 27 at the transmitting point B are preferably separated several thousand feet or a current supply loop of the same magnitude may be employed due to the fact that, in homogeneous earth earth formations, one-half of the current supplied will travel in the earth above a depth equal to the distance between the electrodes. Thus, in order to vary the effective depth of penetration, the spacing between the electrodes 16 and 17 and between the electrodes 26 and 27 may be altered and the readings taken at the various detecting locations C may be repeated to obtain some indication of the depth of the anomalous condition. The currents supplied to the electrodes 16 and 17 and to the electrodes 26 and 27 may be of the order of several amperes and, in order to force a current of this magnitude into the ground through the normal resistance of the electrode-to-ground contact, power generators 15 and 25 of several hundred volts may be required.

The frequencies $f_1$ and $f_2$ developed by the power generators 15 and 25, respectively, also affect the effective penetration of the earth formations. Thus, to obtain deep penetration, the frequencies $f_1$ and $f_2$ should be relatively small or of the order of between a few cycles and several hundred cycles, while somewhat shallower penetration can be obtained if frequencies of the order of several thousand cycles or more are employed. Thus, if the frequencies developed by the power generators 15 and 25 are varied and if the phase measurements at each of the receiving locations C are repeated, a second set of indications is provided from which a qualitative determination of the depth of the anomalous condition may be determined.

When the receiving location C is moved relatively close to either of the transmitting points A or B and, more particularly, at distances of the order of a wavelength or less of the carrier waves radiated from these transmitting points, the electrostatic component and the induction component of the electrical field produced in the vicinity of these transmitting points become of appreciable magnitude when compared to the radiation component which the receivers 30 and 31 are designed to detect. Thus, when the receiving location C is moved relatively close to one of these transmitting points, some phase shift may be encountered in the signals due to the electrostatic and induction components and further calculation or empirical determination of the phase shift at such locations is necessary in order to establish the computed phase shift for homogeneous earth conditions. Anomalous conditions will then be indicated in the manner described above with the only change being in the method of computing the standard or homogeneous earth condition.

Figure 5:
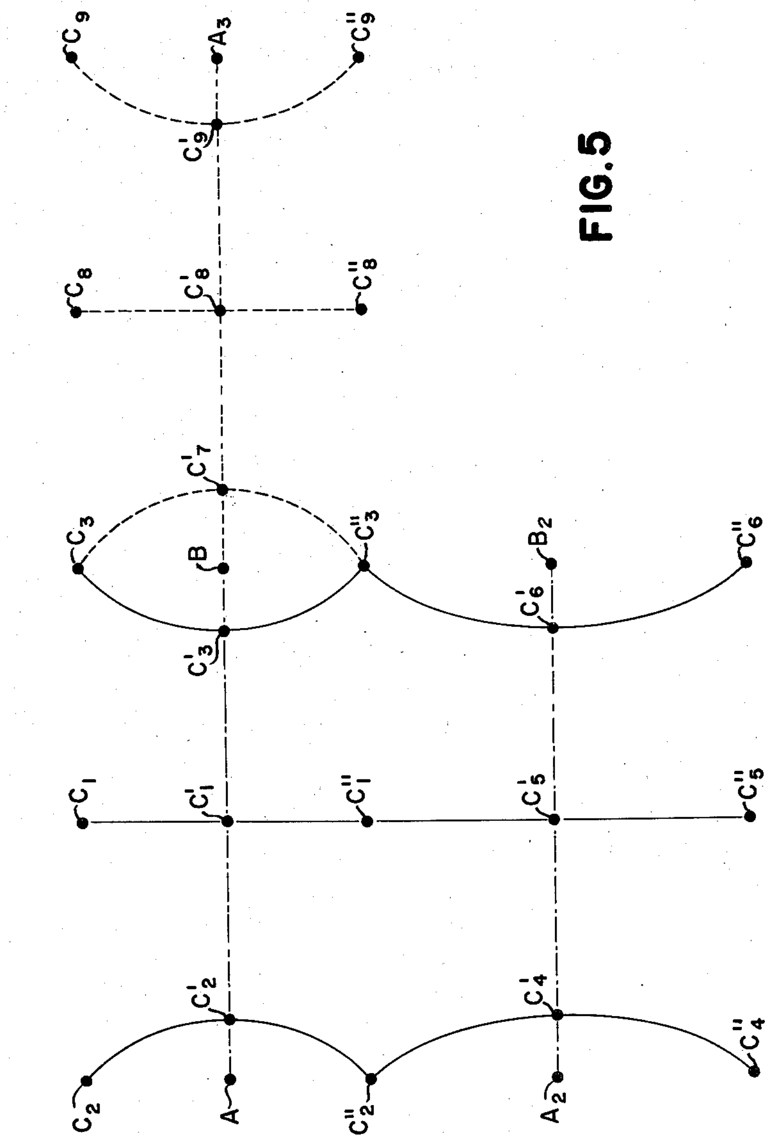
Fig. 5 illustrates the disposition of the transmitting and receiving equipment in making a survey over an extensive area.

In Fig. 5, there is illustrated the position arrangement of the transmitters and the various positions which may be occupied by the receiving location in running a complete survey of a given area. Thus, as illustrated in Fig. 5, the transmitters may be initially positioned at points A and B and the receiving location may be moved to various points along a line midway between the stations A and B and at right angles to the line joining these stations, i.e., along the degenerate hyperbola having foci at points A and B. Thus, the receiving equipment may be first located at point $C_1$ where a phase indication is obtained, after which the receiving unit may be moved to point $C_1'$ and then to $C_1''$ to obtain a series of phase measurements all of which will be identical except for phase variations induced by the existence of anomalous conditions in the transmission paths. All of the phase indication readings will be characterized by high sensitivity so that a relatively few degrees of phase shift will induce appreciable change in the reading of the indicator. From any other point on the base line between the stations A and B, profiles may be followed at which constant phase readings are obtained other than phase variations due to the anomalous conditions. These profiles will be hyperbolas of the type illustrated by the points $C_2$, $C_2'$ and $C_2''$ and by the points $C_3$, $C_3'$ and $C_3''$ with each hyperbola having foci at the points A and B. Obviously, and number of these profiles may be run as required to obtain adequate information concerning the nature of the anomalous conditions.

As previously indicated, additional information concerning the anomalous conditions may be obtained by repeating the above profiles while using different spacings of the current electrodes at the points A and B or by varying the frequency of the signals applied to the earth formations at the points A and B or by using both of these procedures. To extend the survey to the south as viewed in Fig. 5 the transmitting units may be moved to the points $A_2$ and $B_2$ and profiles may be run using the points $C_1''$, $C_5'$, and $C_5''$ located along the perpendicular bisector of the base line between the stations $A_2$ and $B_2$, the points $C_3''$, $C_6'$ and $C_6''$ extending along one hyperbola and the points $C_2''$, $C_4'$ and $C_4''$ extending along a second hyperbola. The points $C_1''$, $C_2''$, and $C_3''$ are thus common to the readings taken at the different pairs of transmitting stations so that the information obtained may be correlated more easily. To extend the survey to the east, the transmitting units may be respectively moved to the points B and $A_3$ and profiles run in the manner indicated above. The points $C_3$ and $C_3''$ will again be common to the reading previously obtained so that the data obtained may be used for mapping of the area being surveyed.

Analysis of the profiles run at different energizing frequencies will, of course, yield a great deal of information concerning the nature and location of the subsurface anomalies. For example, a conducting sheet produces pronounced phase changes at points where the direct ground propagated wave combines with the reflected ground wave, and these changes occur at intervals which are functions of the wave length of the propagated signals. Thus, the points at which these large phase shifts occur may be interpreted by reference to the series of profiles obtained in order to permit a determination of the depth of the conducting sheet. Similarly, a cylindrically shaped conducting anomaly, such as an ore body, when excited by an electrical field produces a secondary field to produce large phase shifts at definite intervals spaced apart as a function of wave length of the propagated ground waves. The spacing between such phase shifts as determined from the series of profiles provides information indicative of the distance to the ore body. Moreover, an anomaly which is small in comparison with the wave length does not have as great an effect upon the phase shift or upon the reflected energy as one which has a magnitude in the order of one full wave length. Thus, the production of a series of profiles at different frequencies yields information indicative of the size of the anomaly producing the phase shifts.

As previously mentioned, the phase of the reference signal is affected to some degree by the anomalous earth conditions existing in the transmission paths between points A and B and the receiving location which cause phase shifts in the accepted signals. As a result, the readings produced by the phase indicator 33 may in certain instances be somewhat difficult to interpret and analyze. This effect may be minimized by use of the equipment illustrated in Fig. 2 wherein a separate reference transmitting station D is employed for developing the reference signal and transmitting the same to each of the receiving locations C. The station D is spaced at some distance from the transmitting points A and B and is preferably so located that the transmission paths of the waves radiated from the points A and B to the reference station differ somewhat from the transmission paths between these points and each of the receiving locations. The equipment provided at each of the transmitting points A and B is similar to that described above and, accordingly, identical reference numerals have been assigned to corresponding components. The equipment provided at the transmitting point B differs slightly from that employed in the system shown in Fig. 1 in that the carrier wave radiated from this transmitter has a frequency of $F_1$ equal to the frequency of the wave radiated from the point A. To this end an oscillator 21*a* is employed to replace the oscillator 21 previously described. The reference transmitter D comprises a transmitter 40 for continuously radiating an amplitude modulated carrier wave to each of the receiving locations C. The transmitter 40 includes an oscillator or carrier wave generator 41 for developing radio frequency signals having a frequency $F_3$, a modulator 42 for amplitude modulating the carrier wave developed by the oscillator 41, and a final amplifier 43 through which the signals from the modulator 42 are passed to an emitting or radiating antenna 44. In addition to the transmitter 40, the reference station D includes a receiver 45 tuned to receive the carrier waves radiated from both of the transmitting points A and B. The modulation components appearing upon the two waves accepted by the receiver 45 are detected and are passed to the signal input terminals of a pair of band pass filters 46 and 47 for separation. The detected modulation component of frequency $f_1$ is, of course, passed by the filter 46 while the detected component of frequency $f_2$ is passed by the filter 47. The output signals from the filters 46 and 47 are delivered to a mixer 48 which heterodynes them and produces a beat signal which may be either the sum or difference frequency but is indicated in Fig. 2 as being the difference frequency $(f_1—f_2)$. The beat signal, which may be referred to as a reference signal, is passed to the modulator 42 where it is amplitude modulated upon the carrier wave developed by the oscillator 41 so that the signal radiated from the reference transmitting station D comprises a carrier wave continuously modulated with a reference signal.

At the detecting location C the modulated carrier wave radiated from station D is accepted by a receiver 37 which is sufficiently selective to reject the carrier waves radiated from the transmitting points A and B. The modulation component appearing upon the signal received from the transmitting station D is reproduced and is passed as a reference signal to one set of signal input terminals of the phase indicator 33. The latter phase indicator, the mixer 34 and the pickup electrodes 35 and 36 are identical to the corresponding elements shown in Fig. 1 and previously described and, accordingly, have been assigned the same reference numerals. As previously indicated, the phase indicator 33 measures the phase relationship between the reference signal supplied from the receiver 37 and the beat signal supplied from the mixer 34, whereby the phase measurement can be compared with a computed value for homogeneous earth formations in order to determine the existence of anomalous conditions. Anomalous conditions existing in the transmission paths from the points A and B to the reference station D will, of course, affect the phase of the reference signal, but, since as previously mentioned these transmission paths are different from the paths between the transmitting points A and B and the receiving location, the phase shifts in the reference signal are minimized. Obviously, anomalous conditions existing in the transmission path between the point B and the receiving station C will have negligible effect upon the phase of the reference signal reproduced by the receiver 37.

As in the system illustrated in Fig. 1 and described above, the effective depth of penetration of the system illustrated in Fig. 2 may be varied by altering the spacing between the pairs of current supply electrodes or by altering the frequency of the signals developed by the power generators 15 and 25. The system illustrated in Fig. 2 may, of course, be employed to produce an area survey of the type described above and illustrated in Fig. 5.

As previously indicated, the depth of penetration of the system is affected by the frequency of the signals supplied to the earth formations. If great penetration is not desired, the arrangement shown in Fig. 3 may be employed wherein a relatively high frequency in the order of one hundred to one thousand kilocycles may be supplied to the earth formations from spaced apart transmitting points A′ and B′. To this end, the equipment provided at the transmitting point A′ may comprise a power generator 115 for developing signals having a frequency $F_4$ to be applied to the earth by means of a pair of spaced apart current electrodes 116 and 117 or by means of a suitable current supply loop. The signals developed by the power generator 115 are also passed through a conventional amplifier 113 to an emitting antenna 114 for space radiation to a receiving station C′ which may occupy selected positions in the general area between the points A′ and B′.

In similar manner, the station B′ may comprise a power generator 125 developing signals having a frequency $F_5$ which may be, for example, five hundred cycles different from the frequency $F_4$. The output signals developed by the generator 125 are supplied to the earth formations through spaced apart current electrodes 126 and 127 or through a current supply loop and, in addition, these signals are passed through an amplifier 123 for space radiation from an emitting antenna 124.

The signals radiated from the station A′ are accepted by a receiver 130 at the detecting location C′ while the signals radiated from the point B′ are accepted by a receiver 131. The receiver 130 is, of course, sufficiently selective to reject the signal radiated from the point B′ while the receiver 131 is sufficiently selective to reject the signal radiated from the point A′. The two signals respectively accepted by the receivers 130 and 131 are supplied to a mixer 132 which heterodynes them and produces a beat or difference frequency signal of $(F_4—F_5)$. This difference frequency serves as a reference signal since it is produced by heterodyning waves passed through the air from the transmitting points A′ and B′ to the detecting location C′. The reference signal developed by the mixer 132 is compared by the phase indicator 133 with a beat frequency developed by the mixer 134 from the two ground signals received from the stations A′ and B′. To this end, pickup electrodes 135 and 136 are respectively connected to the mixer 134 which heterodynes the received ground signals and produces a beat signal of $(F_4—F_5)$. As previously indicated, the phase indicator 134 measures the phase relationship between the latter beat signal and the reference signal and provides phase measurements which may be compared with computed values to determine the existence of anomalous earth conditions in the manner previously described.

As in the systems described above, the frequencies of the signals developed by the power generators 115 and 125 may be altered to affect the depth of penetration or, to accomplish the same result, the spacing between the pairs of current supply electrodes may be varied. The detecting location C′ may, of course, be moved to desired points in the area between the transmission points A′ and B′ in order to conduct a survey of the type illustrated in Fig. 5.

As in the system illustrated in Fig. 1 the phase of the reference signal developed by the mixer 132 is affected to a certain extent by the anomalous earth conditions existing in the transmission paths between the detecting location C′ and the transmitting points A′ and B′. These anomalous conditions induce phase shifts in the space radiated waves and, hence, cause undesired variations in the phase of the signal developed by the mixer 132. To minimize such phase shifts, a system of the type illustrated in Fig. 4 may be employed wherein a separate reference transmitting station D′ is utilized to develop the reference signal and to transmit the same to the receiving location C′ in a manner similar to the reference transmitting station of the system illustrated in Fig. 2. The equipment provided at the points A′ and B′ in the system illustrated in Fig. 4 is identical to that used at the stations A′ and B′ in Fig. 3 and, accordingly, identical reference numerals have been employed for corresponding components of the systems.

The reference transmitting station D′ includes a transmitter 140 which comprises an oscillator or carrier wave generator 141 developing signals having a frequency of $F_6$, a modulator 142 for amplitude modulating the output signals of the oscillator 141 and a final amplifier 143 through which the output signals of the modulator 142 are passed to a radiating antenna 144. In addition to the transmitter 140, the reference transmitting station D′ includes a pair of receivers 145 and 146 respectively tuned to frequencies of $F_4$ and $F_5$. The receiver 145 is, of course, adapted to receive the space radiated signal from the station A′ and to reject the signal from the station B′, while the receiver 146 is adapted to receive the space radiated signal from the station B′ and to reject the signal from the station A′. The signals accepted by the receivers 145 and 146 are both passed to a mixer circuit 148 where they are heterodyned to produce the beat frequency of ($F_4$—$F_5$) which is referred to as a reference signal. This reference signal is passed to the modulator 142 where it is amplitude modulated upon the carrier wave radiated from the reference transmitting station D′. The latter modulated carrier wave is accepted by a receiver 137 at the detecting location C′. The latter receiver is, of course, sufficiently selective to reject the signals radiated from both of the transmitting points A′ and B′. The modulation component appearing upon the wave accepted by the receiver 137 is reproduced and passed to the phase indicator 133 which measures the phase relationship between this reference signal and the beat signal developed by the mixer 134. Again, the observed phase indications may be compared with computed values for homogeneous earth formations in order to determine the existence of anomalous earth conditions.

Still another arrangement which may be used in the practice of the present invention is illustrated in Fig. 6. The system there shown comprises a single transmitting station for imparting signals to the earth formations and a single receiving station responsive to these signals for determining the existence of the anomalous earth conditions. Specifically, the transmitting station comprises a power generator 215 for developing signals having a frequency $f_1$ which are imparted to the earth formations by means of a pair of spaced apart current electrodes 216 and 217, or, alternatively, by means of a current supply loop. The signals supplied to the electrodes 216 and 217, of course, pass through the earth formations to the receiving station. A portion of the signal energy developed by the power generator 215 is also modulated upon a space radiated carrier wave developed by a transmitter 210. The latter transmitter comprises an oscillator 211 developing signals having a frequency $F_1$, a modulator 212 for amplitude modulating the signals developed by the oscillator 211 with the signal energy supplied from the power generator 215 and a power amplifier 213 through which the signals developed by the modulator 212 are passed to a radiating antenna 214.

The carrier wave radiated by the transmitting station is accepted by a receiver 230 at the receiving station where the modulation component of frequency $f_1$ is reproduced and passed to a mixer circuit 232. The signals supplied to the earth formations, on the other hand, are picked up by means of spaced electrodes 235 and 236 or by means of a pickup loop and are supplied through an amplifier 238 to a mixer 234. The mixers 232 and 234 are each excited by signals of frequency $f_2$ developed by an oscillator 239. Thus, the mixer 232 mixes or heterodynes the two signals supplied to its input terminals and produces a reference signal of frequency $f_1$—$f_2$, which is supplied to one set of signal input terminals of phase meter 233. In similar manner, the mixer 234 heterodynes the two signals supplied to its sets of signal input terminals and produces a beat signal of frequency $f_1$—$f_2$ for application to a second set of signal input terminals of the phase meter 233. The latter phase meter, of course, measures the phase relationship between the two excitation signals to facilitate determination of the existence of anomalous earth conditions as described above.

Still another arrangement of the present invention is illustrated in Fig. 7, wherein a two-transmitter, two-receiver system is shown. Specifically, the system there illustrated includes a first transmitting station comprising a power generator 315 for supplying signals of frequency $f_1$ to the earth formations through spaced current electrodes 316 and 317 and a second transmitting station consisting of a power generator 325 for supplying signals of frequency $f_2$ to the earth formations by means of spaced current electrodes 326 and 327. Both of the signals supplied to the earth formations are detected at a pair of spaced apart receiving stations located at some distance from the two transmitting stations. At one of the receiving stations the two signals are picked up by means of current electrodes 319 and 320 and are supplied to a mixer and amplifier circuit 318. The latter circuit heterodynes the two signals picked up and produces a reference signal of frequency $f_1$—$f_2$ which is amplitude modulated upon the output wave of transmitter 310. The latter transmitter includes an oscillator 311 developing a carrier wave of frequency $F_3$, a modulator 312 for amplitude modulating this carrier wave and a power amplifier 313 through which the amplitude modulated signals produced by the modulator 312 are passed to a radiating antenna 314.

The modulated carrier wave radiated by the transmitter 310 is accepted at the second receiving station by a receiver 330 which reproduces the modulation component of frequency $f_1$—$f_2$ and passes it to one set of signal input terminals of a phase meter 333. The second set of signal input terminals of the latter phase meter is excited by the signals from a mixer and amplifier circuit 338 which is effective to heterodyne or mix the two signals of frequency $f_1$ and $f_2$ picked up by current electrodes 335 and 336. For the reasons described above, existence of anomalous earth conditions in the formations through which the signals $f_1$ and $f_2$ pass will cause a corresponding phase change in the indications appearing up the meter 333.

In view of the foregoing description it will be observed that the present invention provides a method and apparatus of electrical prospecting which does not require the use of cables or transmission lines interconnecting the transmitting stations of the system nor does it entail the use of cables interconnecting the receiving locations and the transmitting points. The equipment provided at the receiving location in all embodiments of the invention is relatively simple and, hence, may easily be transported from place to place. The phase indications provided are characterized by relatively high sensitivity, due to the fact that variations in geologic conditions affect the phase relationships between the signals far more than they affect the amplitude of the signals and, hence, the present system is considerably more accurate than those systems of the prior art which employ field intensity measurements to indicate the geologic conditions. In addition, the measurements provided in the systems of the present invention are not affected to any great extent by topographic variations.

While particular embodiments of the invention have been shown, it will be understood, of course, that the invention is not limited thereto, since many modifications may be made, and it is therefore contemplated by the appended claims to cover any such modifications as fall within the true spirit and scope of the invention.

What is claimed as new and desired to be secured by Letters Patent of the United States is:

1. An electrical prospecting system for determining the character of earth formations comprising spaced apart current supply means for transmitting currents of different frequency through the earth formations, means for detecting the earth transmitted currents at a location spaced from both of the current supply means, at least one wave radiating transmitter cooperating with the current supply means to transmit signals representative of the currents through space to said location, means responsive to said signals for developing a reference signal representative of the beat frequency between the currents, means for heterodyning the detected currents at said location to obtain a beat signal, and means for measuring the phase relationship between the reference signal and the beat signal.

2. The system defined by claim 1 wherein a wave radiating transmitter cooperates with each of said current supply means and wherein said transmitter includes means for modulating said currents upon distinguishable carrier waves, and means are provided at said location for detecting and heretodyning the modulated currents to develop said reference signal.

3. The system defined by claim 1 wherein a wave radiating transmitter cooperates with each of said current supply means and wherein said transmitter includes means for modulating said currents upon distinguishable carrier waves, and means are provided at said location for detecting the modulated currents and developing therefrom said reference signal.

4. The system defined by claim 1 wherein a wave radiating transmitter cooperates with each of said current supply means and wherein said transmitter includes means for modulating said currents upon distinguishable carrier waves, a reference station is provided at a location spaced from both current supply means and this station includes means for detecting and heterodyning the modulated currents to develop the reference signal and also including means for modulating the reference signal upon a space radiated wave, and means are provided at said location for receiving the last-mentioned wave and for reproducing the reference signal.

5. The system defined by claim 1 wherein a wave radiating transmitter is associated with each of said current supply means and the signals radiated by said wave radiating transmitters are respectively equal in frequency to the currents applied to the earth formations, and means are provided at said location jointly responsive to the space radiated signals for developing said reference signal.

6. The system defined by claim 1 wherein a wave radiating transmitter is associated with each of said current supply means and the signals radiated by said wave radiating transmitters are respectively equal in frequency to the currents applied to the earth formations, and means are provided at said location for receiving and heterodyning the space radiated signals in order to develop said reference signal.

7. The system defined by claim 1 wherein a wave radiating transmitter is associated with each of said current supply means and the signals radiated by said wave radiating transmitters are respectively equal in frequency to the currents applied to the earth formations, and a reference station spaced from both current supply means is provided and includes means for receiving both of the space radiated signals and developing the reference signal therefrom and also includes means for modulating said reference signal upon a space radiated wave, and means are provided at said location for receiving the space radiated wave and reproducing the reference signal.

8. The system defined by claim 1 wherein a wave radiating transmitter is associated with each of said current supply means and the signals radiated by said wave radiating transmitters are respectively equal in frequency to the currents applied to the earth formations, and a reference station spaced from both current supply means is provided and includes means for receiving and heterodyning both of the space radiated signals in order to develop the reference signal and also includes means for modulating said reference signal upon a space radiated wave, and means are provided at said location for receiving the space radiated wave and reproducing the reference signal.

9. A method of electrical prospecting for determining the characteristics of earth formations comprising the steps of applying currents of different frequency to spaced apart points in the earth formations, detecting and heterodyning said currents at a plurality of different locations spaced at predetermined distances from the points of application in order to obtain difference frequency signals, obtaining a reference signal representative of the beat frequency between said currents, and measuring the phase relationship between the difference frequency and reference signals at each of said locations in order to determine the effect of movement of the detecting location upon the measurements and, hence, to ascertain the presence of anomalous earth conditions.

10. The method of claim 9 additionally comprising the step of varying the frequencies of each of the applied currents and detecting the resulting currents at each of said locations.

11. The method of claim 9 which comprises the additional step of measuring the distances between each of said locations and the points of application of the currents.

12. The method of claim 10 which comprises the additional step of measuring the distances between each of said locations and the points of application of the currents.

13. A method of electrical prospecting for determining the characteristics of earth formations comprising the steps of applying currents of different frequency at spaced apart points in the earth formations, detecting said currents at a plurality of different locations spaced along the perpendicular bisector of a line joining the points of application of the currents, and meansuring the effect of movement of the detecting location upon the phase of the detected currents in order to ascertain the presence of anomalous earth conditions.

14. A method of electrical prospecting for determining the characteristics of earth formations comprising the steps of applying currents of different frequency to spaced apart points in the earth formations, detecting and heterodyning said currents at a plurality of different locations spaced along the perpendicular bisector of a line joining the points of application of the currents in order to obtain difference frequency signals, obtaining a reference signal at each of said locations representative of the beat frequency between said currents, and measuring the phase relationship between the difference frequency and reference signals at each of said locations in order to determine the effect of movement of the detecting location upon the measurements and, hence, to ascertain the presence of anomalous earth conditions.

15. A method of electrical prospecting over the surface of the earth, said method comprising the steps of transmitting currents through the earth from regions spaced substantial distance apart, detecting said currents at a detecting location spaced from each of said regions, measuring the phase relationships of the currents, and moving said detecting location along a line where the phase measurement remains constant, said line in the absence of anomalous earth conditions being hyperbolic with foci at said regions so that deviations from the hyperbolic line in order to maintain the phase measurement constant are indicative of the presence of anomalous earth conditions.

16. The method set forth in claim 15 which comprises the additional step of moving said location in sequence along a plurality of different constant phase measurement lines each of which in the absence of anomalous earth conditions will be hyperbolic in contour with its foci at said regions.

17. A method of continuous electrical prospecting over the surface of the earth which method comprises the steps of transmitting currents through the earth from first and second spaced apart transmitting locations, detecting said currents at a detecting location spaced from both of said transmitting locations, moving the detecting location in sequence to points disposed along a constant phase line made up of locations at which the phase relationship between the detected currents remains constant, said line in the absence of anomalous earth conditions being hyperbolic in contour with foci at the transmitting locations, and measuring the phase relationships of the detected currents at each of said points.

18. A method of continuous electrical prospecting over the surface of the earth which method comprises the steps of transmitting currents through the earth from first and second spaced apart transmitting locations, detecting said currents at a detecting location spaced from both of said transmitting locations, moving the detecting location in sequence to points located along a constant phase line made up of locations at which the detected currents have a constant phase relationship, said line in the absence of anomalous earth conditions being hyperbolic in contour and having foci at said first and second transmitting locations, moving the detecting location in sequence to points located along other constant phase lines which in the absence of anomalous earth conditions also have foci at the first and second transmitting locations, moving at least one of said transmitting locations to a third transmitting location, moving the detecting location in sequence to points disposed on a constant phase line which in the absence of anomalous earth conditions will be hyperbolic in contour with one focus at the third transmitting location, the last named constant phase line intersecting at a common point one of the constant phase lines having foci at the first and second transmitting locations, and measuring the phase relationships of the detected currents at each of said points including said common point.

19. A method of continuous electrical prospecting over the surface of the earth which method comprises the steps of transmitting currents through the earth from first and second spaced apart transmitting locations, detecting said currents at a detecting location spaced from both of said transmitting locations, moving the detecting location in sequence to points located along a constant phase line made up of locations at which the detected currents have a constant phase relationship, said line in the absence of anomalous earth conditions being hyperbolic in contour and having foci at said first and second transmitting locations, moving the detecting location in sequence to points located along other constant phase lines which in the absence of anomalous earth conditions also have foci at the first and second transmitting locations, moving said transmitting locations to third and fourth transmitting locations, moving said detecting location in sequence to points disposed on a constant phase line which in the absence of anomalous earth conditions is hyperbolic with foci at the third and fourth locations and which intersects at a common point one of the constant phase lines having foci at the first and second locations, and measuring the phase relationships of the detected currents at each of said points including said common point.

20. A method of continuous electrical prospecting over the surface of the earth which method comprises the steps of transmitting currents through the earth from first and second spaced apart transmitting locations, detecting said currents at a detecting location spaced from both of said transmitting locations, moving the detecting location in sequence to points located along a constant phase line made up of locations at which the detected currents have a constant phase relationship, said line in the absence of anomalous earth conditions being hyperbolic in contour and having foci at said first and second transmitting locations, moving the detecting location in sequence to points located along other constant phase lines which in the absence of anomalous earth conditions also have foci at the first and second transmitting locations, moving said first transmitting location to a third location, moving said detecting location in sequence to points disposed on a constant phase line which in the absence of anomalous earth conditions is hyperbolic with foci at said second and third locations and which intersects at a common point one of the constant phase lines having foci at the first and second locations, and measuring the phase relationships of the detected currents at each of said points including said common point.

21. An electrical prospecting system for determining the character of earth formations, said system comprising means for transmitting a first alternating current through the earth formations from a location adjacent the earth's surface, means for detecting the first current at a position disposed adjacent the earth's surface and spaced from the transmitting means, a wave radiating transmitter for transmitting signals derived at least in part from said first current through space to the detecting means, means in the system for developing a second alternating current of different frequency than the first current, means at the detecting position responsive to the space transmitted signals and to the second alternating current for producing a reference signal, means at the detecting position responsive to the detected earth transmitted current and to the second alternating current for developing a beat signal, and means for measuring the phase relationship between the reference signal and the beat signal.

22. The system defined by claim 21 wherein means are provided at the detecting position for heterodyning the detected earth transmitted current with said second alternating current to develop said beat signal and wherein means are provided in the system for heterodyning the space transmitted signals with the second alternating current to develop the reference signal.

23. An electrical prospecting system for determining the character of earth formations, said system comprising means located at a position adjacent the earth's surface for transmitting a first alternating current through the earth formations, a wave radiating transmitter for transmitting through space from said first position signals derived at least in part from said first current, means in said system spaced from said position for developing a second alternating current of different frequency than the first current, and a single indicating means spaced from said position and jointly responsive to the second alternating current, the space radiated signals and the earth transmitted first current for measuring phase shifts in the earth transmitted first current in order to determine the presence of anomalous earth conditions.

24. An electrical prospecting system for determining the character of earth formations, said system comprising means located at a position adjacent the earth's surface for transmitting a first alternating current through the earth formations, a wave radiating transmitter for transmitting through space from said position signals derived at least in part from said first current means in said system for developing a second alternating current of different frequency than the first current, means spaced from said position for heterodyning the space radiated signal and the second alternating current to develop a reference signal, means spaced from said position for detecting the first earth transmitted current and for heterodyning the detected first current with said second current to develop a beat signal, and means for measuring the phase relationship between the beat signal and the reference signal.

References Cited in the file of this patent

UNITED STATES PATENTS

| | | |
|---|---|---|
| 1,912,036 | Hedstrom | May 30, 1933 |
| 2,104,440 | Statham | Jan. 4, 1938 |
| 2,156,259 | Blau | May 2, 1939 |
| 2,276,974 | Howard | Mar. 17, 1942 |
| 2,398,761 | Aiken | Apr. 23, 1946 |
| 2,411,696 | Silverman | Nov. 2, 1946 |
| 2,446,527 | Chun | Aug. 10, 1948 |
| 2,608,602 | Muffly | Aug. 26, 1952 |
| 2,642,477 | Puranen | June 16, 1953 |
| 2,652,530 | Davidson | Sept. 15, 1953 |